(12) United States Patent
Johnstone et al.

(10) Patent No.: US 6,505,437 B1
(45) Date of Patent: Jan. 14, 2003

(54) WEED AND PLANT PESTS CONTROL APPARATUS AND METHOD

(75) Inventors: Ian Johnstone, Calwell (AU); Robert Smith, Penrith (AU)

(73) Assignee: Origin Energy LPG Limited, Milton (AU)

( * ) Notice: Subject to any disclaimer, the term of this patent is extended or adjusted under 35 U.S.C. 154(b) by 0 days.

(21) Appl. No.: 09/647,093

(22) PCT Filed: Oct. 20, 1999

(86) PCT No.: PCT/AU99/00900

§ 371 (c)(1),
(2), (4) Date: Nov. 1, 2000

(87) PCT Pub. No.: WO00/22926

PCT Pub. Date: Apr. 27, 2000

(30) Foreign Application Priority Data

Oct. 20, 1998 (AU) .............................................. PP6631

(51) Int. Cl.[7] .............................................. A01M 21/04
(52) U.S. Cl. .......................................... 47/1.44; 47/1.7
(58) Field of Search ................................ 47/1.44, 48.5, 47/1.7; 43/144; 111/118, 120

(56) References Cited

U.S. PATENT DOCUMENTS

| 3,636,939 | A | * | 1/1972 | Sijbring ............... 126/271.2 R |
| 5,381,958 | A | * | 1/1995 | Koblmuller et al. ......... 239/136 |
| 5,385,106 | A | * | 1/1995 | Langshaw .................... 111/127 |
| 5,848,492 | A | * | 12/1998 | Brown ......................... 47/1.44 |
| 5,927,601 | A | * | 7/1999 | Newson et al. ................ 239/1 |
| 5,946,851 | A | * | 9/1999 | Adey et al. .................... 47/1.5 |
| 6,073,859 | A | * | 6/2000 | Gorgens ...................... 239/13 |

FOREIGN PATENT DOCUMENTS

| JP | 407274798 A | * 10/1995 | .......... A01M/21/04 |
| NZ | 237 524 | 4/1995 | |
| WO | WO 94/00641 | 1/1994 | |
| WO | WO 96/03036 | 2/1996 | |

\* cited by examiner

Primary Examiner—Peter M. Poon
Assistant Examiner—Son T. Nguyen
(74) Attorney, Agent, or Firm—Finnegan, Henderson, Farabow, Garrett & Dunner, L.L.P.

(57) ABSTRACT

A method of destroying or controlling unwanted vegetation and agricultural pests is disclosed. The method produces a jet stream of treatment fluid, being mixed combustion gas and superheated or dry steam for application to thermally destroy unwanted vegetation and posts. The method involves the use of a hydrocarbon burner and a water source.

36 Claims, 6 Drawing Sheets

WEED AND PLANT PESTS CONTROL APPARATUS AND METHOD

FIELD OF THE INVENTION

The present invention relates to devices which generate a heated flow of fluid that can be used in agriculture and other applications where it is required to raise the temperature of objects or the environment for short periods of time. The invention is also concerned with an improved agricultural implement and method for controlling or eradicating weeds and pests that affect arable land and useful plants, by means of the application of a heated fluid onto areas affected by such unwanted agents.

BACKGROUND OF THE INVENTION

The present invention has been developed in light of perceived shortcomings of known combustive plant pest and weed control apparatus as used in flame cultivation. However, the concept underlying the invention has uses in other fields of application as will be discussed below. Accordingly, whilst the following background description relates to weed control applications in the agricultural field, the invention is not intended to be restricted to such field only.

Within the agricultural industry, various methods are known and recognised for controlling the growth of and eradicating weeds and other undesirable pests that affect useful crops and plants.

Herbicides and pesticides are by far the most commonly used weapons for weed and pest control. However, there is an ever growing concern about degradation of the environment, adverse effects which herbicides have on crops, as well as the creation of herbicide and pesticide resistant strains of noxious weeds and pests. Various alternatives to the (sole) use of chemical agents have thus been proposed in the past.

Flame cultivation and other thermal-energy based weed control methods have been studied over the years as alternatives to or collaterals to herbicide and pesticide use.

Flame cultivation involves the short-time application of high intensity heat that is generated through combustion of liquified petroleum gas (LPG) or other hydrocarbon fuels and carried to the treatment area by the combustion gases. The heat application has to be sufficient to generate a sudden increase of temperature in the leaf cells of the weed to about 50 to 70° C. such as to cause cell damage in the leaves and stems of young, green weeds and to kill pests such as bacteria, weevils, insects or fungus spores and the like that are likely to attack valuable crop plants. This leads in time to withering of the leaves and stems of the weed and ultimately results in the death of susceptible weeds, without destroying the crop plant. U.S. Pat. No. 3,177,922 (Pardee) discloses a flame cultivator with a battery of LPG burners mounted on a tool bar carried by a tractor. The individual burners are adjustably mounted on the traverse support bar in staggered arrangement to coincide with the spacing of crop rows and such as to direct the hot combustion gases to the base of the crop plants. In order to thermally insulate and protect the upper parts of the crop plants it has been proposed to use air curtains to confine the heat of the flames to the base of the plants, see U.S. Pat. No. 3,477,174 (Lalor). Problems are also experienced with flaming treatments caused by overheating of the crop plant such as leaf damage. U.S. Pat. No. 5,189,832 (Hoek et al) discloses one proposal to reduce the heat damage to the plant by creating a horizontal, cool air curtain near the base of the plant to restrict rising hot air which tends to damage the leaves. Other devices such as the one disclosed in U.S. Pat. No. 5,020,510 (Jones) and WO 97/03557 (Waipuna) use tractor-drawn, open-bottomed, rectangular shrouds supported on wheels which are drawn over a weed-infested area, wherein air and some of the combustion gases are recirculated within the shroud plenum chamber using fans and maintained at temperatures of around 300° C. during soil treatment.

U.S. Pat. No. 213,255 (Simpson) and AU-B 50364/93 (P. C. Wagner) disclose a railroad-bound apparatus which uses steam and/or hot water to kill vegetation on railroad beds. The hot water/steam destroys the cells of the plants which eventually wilt. This principle has also found application with devices that can be more readily used in agriculture, compare the hand carried devices of GB-A 2306151 (Arnold) and JP-A 07-274798 (Kubo). Some devices use an electrical heater to generate the steam, as in RU-A 2002410 (Kerimova). Some devices incorporate shrouds or applicator-box constructions to create a more controllable steam application environment, GB-B 2122511 (Makar). Devices have also been proposed which prolong the dwell time which the hot water/steam has to effect thermal damage of the cells of unwanted weeds, including surface contacting structures such as endless belts and aprons. These devices retain and/or "press" the heat into the plants and temporarily maintain the area surrounded by the apron insulated from ambient conditions, compare U.S. Pat. No. 5,430,970 (Thompson) and WO 94/11110 (Aquaheat Technology), the latter document disclosing the use of heated water alone or in mixtures with herbicides/pesticides to effect weed and pest destruction.

In yet another modification of the basic principle of using hot water/steam to kill weeds and crop damaging insects and pests, it is known from WO 94/26102 (Waipuna) to spray the foliage of weeds with pressurised hot water and steam at temperatures ranging from 75° C. to 120° C. The pressurised hot fluid is applied in close vicinity to the ground through jet nozzles at water flow rates of about 4 to 15 liter per minute. The steam generating boiler, the water supply tank and the pressurising pump are carried on a van or tractor, whereas the applicator device, which can be a simple hand-pushed applicator head with fluid delivery jets situated within an open-bottomed box, or a towed boom applicator with multiple jets, is supplied via insulated hoses with the hot treatment fluid. A hand-held device using a single jet of pressurised, electrically heated water steam is known from NZ-A 237524.

In a further modification of the basic principle of using heated fluids to destroy weeds, DE-A 3639705 discloses a mobile weed destroyer that includes a water tank and a steam generator carried on a suitable vehicle. The steam generator, which is a petrol-fired boiler, is arranged to deliver superheated steam at pressures greater than 10 bar and temperatures of more than 180° C. via a suitably insulated, flexible hose to a manually handled spraying head having a jet discharge nozzle disposed within a parabolic-shaped reflector shroud.

Common to all of the above devices and methods is that they use dedicated steam generators or boilers, either electrically heated or fuel-fired, for the generation of the treatment fluid (whether hot water, hot water/steam mixtures, wet steam or super heated steam). The electricity-heated steam generators require a separate power source, like a battery or an electric generator driven by the engine of the vehicle drawing or carrying the steam generator, thus increasing investment costs for such devices. Fuel-fired boilers are energetically inefficient, as they generate a substantial amount of waste heat.

Other devices and methods which rely on thermal shock to control or destroy weeds and vermin simply use a blast of electrically heated air, e.g. GB-A 2278988 (Morgan), or a mixture of pressurised combustion gases and air, e.g. AU-B 10256/83 (Morris). Here, the heated air flow is directed onto a treatment area that is covered by suitably shaped, mobile hood or shroud that is moved over the treatment area and which increases the dwell time the heated gases have to damage the cells of the weeds or plant pests.

One of the main problems which need to be addressed in flame cultivation is the tendency of dry vegetation to ignite even where the burner flames of the flame cultivator are kept well distanced from the treatment zone. Another problem is the tendency of the hot combustion gases to rise away from the treatment zone, i.e. the dwell time is often insufficient to accomplish the required rise in temperature of the weeds. This latter problem has been sought to be addressed by using treatment boxes and aprons in a manner similar to the above described devices which employ steam as the treatment fluid. Other solutions involve the use of specialised burner arrangements such as disclosed in WO 98/01031 (Johnstone et. al.).

WO 96/03036 (Adey el. al.) discloses a weed killing device and method which combines the principles of pure flame cultivation (which only uses hot combustion gases as a treatment fluid) and hot water weed killing. The device of Adey addresses the vegetation ignition problems present with some flame cultivation devices. In the hand-pushed device of Adey, water from a container carried by a vehicle is introduced in the form of free water droplets or a fine water mist into a tubular burner chamber supported on wheels. The water droplets are heated and carried away by a blast of air that is heated by a gas burner; the mixture of air, water and combustion gases exits the open bottom-end of the burner housing towards the treatment area. It is said that the water may become heated enough to form hot water vapour, steam or high humidity air. Adey specifically requires large volumes of heated air to be delivered to the treatment zone. To achieve the required high flow rates of 600 to 5000 liter/minute of air passing through the burner housing, Adey suggests to use a blower fan or a compressed air source, whereby air at 0.5 to 10 bar is delivered through an appropriately dimensioned air inlet bore into the burner housing. The need for large volumes of pressurised air substantially increases equipment costs and equipment size. The weed killing method of Adey also requires the foliage of the weeds to be wetted sufficiently so that this is visible to the naked eye, and water consumption is said to be 30 to 60 liter per hour, which for a hand-pushed applicator device with only one burner might not be a problem. However, for applications requiring a battery of burners to treat larger areas of land, water consumption will severely limit the operational range of such device, because of the need for frequent refilling of the supply tank carried by the vehicle. If large tanks are used, the downside is soil compaction, due to the increased weight of the appliance.

AIM OF THE INVENTION

The present invention seeks to provide a viable alternative to known combustive weed killing devices and methods.

In particular, it would be advantageous if some or all of the above mentioned shortcomings of the Adey device and method would be addressed. In other words, it would be advantageous for the present invention to provide, in one of its aspects, a basic weed destroying unit which uses a hydrocarbon fuel, e.g. LPG, as a heat energy source, to generate a hot gas to which water is added thereby to create a hot treatment fluid that can be applied to unwanted vegetation and crop pests without the risk of igniting dry weeds and similar unwanted plants, the unit being optimised with regards to the amount of useful heat which can be delivered to the unwanted plants in order to destroy them.

The present invention, in another aspect thereof, also seeks to provide a device that can deliver a heated stream of fluid for use in other areas of agriculture, e.g. thermal fumigation of grain silos, sterilisation of soils, thermal defoliation of crops and other vegetation, to counter localised frost in orchards and the like, heat greenhouses or other enclosed or semi-open areas, or generally heat spaces and surfaces.

SUMMARY OF THE INVENTION

In a first aspect, the present invention provides a method of destroying or controlling unwanted vegetation and agricultural pests, including the steps of:

generating, preferably within a housing shroud that has a mixing chamber and with at least one hydrocarbon-fuel burner, a hot precursor gas consisting essentially of combustion gases from a hydrocarbon fuel, preferably LPG;

using the hot precursor gas and/or the burner flames to heat a steam generator that is connected to a source of water to such an extent as necessary for the water to be converted into saturated steam, wet steam, or a mixture thereof, this precursor fluid being delivered into the mixing chamber;

passing the hot precursor gas through the mixing chamber for mixing with the precursor fluid thereby to effect direct heat exchange with the precursor fluid and form a hot treatment fluid that includes combustion gases, air and water in form of dry steam, super heated steam or a mixture of such steams;

inducing the hot treatment fluid to flow through and exit the mixing chamber through a discharge opening of the housing shroud, in form of a jet stream; and applying the jet stream of hot treatment fluid onto a treatment area where unwanted vegetation, in particular weeds and agricultural pests, are to be thermally destroyed.

Preferably, the flow induction step is performed by pressuring the precursor fluid and ejecting the pressurised precursor fluid through a jet orifice into the mixing chamber, and by using appropriately dimensioned burner jet nozzle(s) for generating a hot precursor gas jet stream which is directed into the mixing chamber in a direction substantially towards the discharge opening of the housing shroud, thereby aspirating additional air into the mixing chamber, which is also heated and expelled.

With this method, it is possible to utilise more of the energy contents of the hydrocarbon fuel in the destruction of weeds than is possible with conventional, combustive flame cultivation techniques. In the latter case, heat transfer to the weeds and pests is accomplished solely by means of a mixture of air and combustion gases. Substantial heat transfer losses are associated with this type of heat transfer. With the method of the present invention, part of the energy contents of the fuel is used to generate the initially very hot combustion gases and a part thereof to generate the less hot precursor fluid. Part of the heat contents of the very hot gases is then transferred into the water, i.e. through generation of dry (or even partly superheated steam) from the previously wet or saturated steam. Latent evaporation heat (or energy) is "stored" in the water during the two-stage dry steam generation process, whereby heat uptake is effected in two stages, i.e. through indirect heat exchange in the steam generator and subsequently in direct heat exchange with the hot combustion gases. The heat transfer coefficient of the resultant treatment fluid is increased as compared to that of hot gases alone. Upon coming into contact with the weeds, the dry steam component of the treatment fluid will condensate (at least partly) and thereby transfer part or all of the latent heat content to the weeds and plant pests, which heat content will be added to that transferred by the combustion gases upon coming in contact with the weeds. This measure will increase the total amount of heat transferred into the weeds from initial contact with the treatment fluid because the condensing water releases its heat contents over a longer period of time than pure combustion gases do, as the latter do not readily maintain intimate contact with the weed foliage (the heated gases do not "adhere" to the foliage); heat uptake by the weed foliage is thus improved.

The generation of wet and/or saturated steam in a dedicated steam generator element, e.g. a heater coil or plate element located within the housing shroud, and the subsequent generation of dry steam through direct heat exchange with the same combustion gases will reduce the temperature of the precursor gas, the temperature reduction being dependent on the amount of water added. This provides an effective mechanism of lowering the otherwise high temperatures of the combustion gases (about 900° C. to 1100° C.) so that the temperature of the treatment fluid can be maintained at a level that is safe to reduce the likelihood of ignition of dry objects present in the treatment zone, while ensuring it is high enough, preferably 300° C. to 450° C., and contains enough energy, to thermally destroy the weeds and pests.

Further, whilst dry and superheated steam have a tendency to rise in similar fashion to hot combustion gases, upon coming into contact with colder surfaces, steam will readily condense on the weeds, thereby ensuring a more efficient transfer of heat into the weed foliage. Accordingly, there is not as pronounced a problem with rising heat from the treatment zone at the base of useful crops as is the case with normal combustive flaming methods, as was described above. This avoids the need for cool air curtains and similar means to insulate the upper regions of plants.

The hot treatment fluid is advantageously prepared within an "in-line" shroud of tubular configuration that houses at or near a terminal end thereof at least one burner nozzle having a jet delivery orifice of predetermined size to generate a high velocity flame.

Suitable hydrocarbons as fuel include diesel and LPG, though the latter may be preferred for environmental reasons, as it combusts more cleanly than diesel. Also, use of diesel as a fuel source will generally require the provision of a separate pump to effect high pressure injection through an appropriately sized delivery organ into the burner shroud to generate a jet flame.

When using liquified petroleum gas (LPG), the LPG is advantageously vaporised from its liquid storage state during normal operation of the burner prior to being delivered to the burner jet nozzle. Advantageously, vaporisation of liquid LPG fuel is carried out within a simple vaporiser tube arranged within a shroud of the burner itself. LPG can be supplied from a storage cylinder to the burner at operating pressures of between 50 and 130 PSI gas pressure (3450 hPa to 8960 hPa gas pressure) without requiring a pressurisation pump. It has been established that addition of between 5 to 15 liter water per hour, preferably 10 liter per hour, to the precursor gas jet stream consisting of combustion gases and hot air will result in a treatment fluid delivered via the discharge opening at the terminal end of the tubular shroud at application temperatures of about 380° C. to about 400° C.

Preferably, the treatment fluid is delivered to the treatment area by moving the discharge opening of the shroud over the ground while keeping it a predetermined distance from the ground. It is also possible to connect a flexible, heat-insulated delivery hose to the discharge opening of the tubular shroud so that the hot treatment fluid can be delivered for topical application at a location not in imminent neighbourhood of the device.

An important further feature of the invention resides in the provision of a self-aspirating shroud construction where the precursor fluid is discharged through a small orifice into the tubular housing shroud thereby to create a draught and induce gas flow from a rear region within the shroud, where the burner nozzle and combustion air inlet openings would be ideally located, or from a breather opening(s) located forward of the burner, towards the discharge opening at the front of the shroud. In other words, a device or unit for the generation of hot treatment fluid is preferred which is self-aspirated rather than force-fed with combustion air for the burner, and additional (surplus) air. This measure obviates the need for additional equipment to increase air flow mass through the shroud, as is necessary with the device of Adey which is discussed above. Self-aspiration also generates an increase in mass flow of hot gases (surplus air and combustion gases) which take up heat energy for delivery to the weeds.

There are different ways in which self-aspiration can be achieved, e.g. by creating a venturi within the shroud in a zone where the wet or saturated steam is delivered into the mixing chamber thereby to accelerate the treatment fluid as well as providing a suction force that draws-in additional air, through appropriately located openings at the shroud.

In another aspect of the present invention, there is provided a device for generating a heated flow of fluid for heating purposes, including:

at least one gas burner disposed to be connected to a fluid hydrocarbon fuel source and generate a combustion flame and combustion gases;

a hollow shroud member at which the burner(s) is received, the shroud having at least one breather opening through which air can enter into the shroud cavity, a mixing chamber and a discharge outlet for delivery of a hot fluid jet stream; and a steam generator disposed within the housing shroud for heating by the combustion flames, the steam generator being arranged for delivery of wet and/or saturated steam and having an inlet disposed to be connected to a source of water and a jet delivery outlet for delivery of a heated jet stream of water steam in a direction generally towards the discharge outlet of the shroud upon the steam generator being heated by the combustion flames, the mixing chamber being arranged so as to receive the jet streams of water steam, combustion gases and surplus air aspirated into the housing shroud, whereby these fluids are mixed therein to form said hot fluid jet stream in which the water component is further heated through direct heat exchange with said combustion gases to form at least dry steam prior to expulsion of the hot fluid jet stream past said discharge outlet.

The shroud member may preferably be a simple stainless steel tube section of small wall thickness, at or within which the burner(s) and steam generator are mounted.

Preferably, one burner having a jet nozzle for high velocity burner flames is located within the shroud.

Advantageously, the device includes means for generating a pressure differential between the outside and inside of the shroud thereby to provide a self-aspirating device configuration. This can be achieved by forming and appropriately locating a venturi structure within the tubular shroud member.

However, it is also possible to dispense with aerodynamic airflow generating bodies (such as a venturi structure) within the shroud by providing the steam generator, which preferably is a simple steam generator coil, with a terminal, preferably straight tube portion that carries or forms the jet delivery outlet, which is arranged preferably co-axial within the tubular shroud at a downstream location from the burner jet nozzle(s). With such arrangement, discharge of the water steam jet stream in a substantially uniaxial, high velocity fluid flow pattern towards the front end of the tubular shroud (where the discharge outlet is located) will create a draught which aspirates air into the shroud cavity, either through the rearward open end of the shroud or through apertures in the circumferential wall of the shroud that are preferably located upstream of the delivery outlet. The size of the breather apertures and/or the rear open end should preferably be adjustable to control air ingress into the shroud, and thus regulate stoichometry of the combustion flame and the amount of air that is sucked into and discharged at high speed from the shroud.

The steam generator is preferably of coil-type, wherein the coil is dimensioned and has a predetermined number of coil turns sufficient to ensure that water entering the coil at a given flow rate and temperature is heated during passage therethrough to such an extent that the water, at the delivery outlet of the heater coil, is discharged as a pressurised jet of saturated steam or a mixture of wet steam and saturated steam. This fluid can then readily be heated further to generate dry (or superheated) steam when subsequently exposed to direct heat exchanging contact with the hot combustion gases.

The coil may be manufactured using smooth stainless-steal tubing or, for increased heat transfer coefficient, surface corrugated tubing, in particular spirally corrugated tubing of a suitable material.

The steam delivery outlet can be formed at a separate metering member mounted at the end of a straight portion of the heater coil, or by properly dimensioning the bore of the heater coil to ensure it is of adequate size to generate a pressurised discharge jet of wet steam, e.g. a coil with a bore diameter of about 3 to 4 mm. This measure enables the device to be operated with water that may contain small, suspended particles without the risk of blockage of the heater coil.

A metering valve can be located in the supply line from the water reservoir to which the steam generator coil is connectable. The water reservoir can be a simple plastic tank with 250 litre capacity, which at a water consumption rate of between 8 to 15 liter per hour per steam generator would avoid the need for constant refilling. The water is supplied to the steam generator at sufficient pressure to maintain a desired water flow rate, e.g. at a line pressure of between 40 and 80 Psi. A suitable mechanical or electric pump and valve are heretofore located between the water supply tank and the heater coil inlet coupling to ensure proper water delivery rate and pressure.

To further improve heat transfer efficiency and in particular minimise heat loses associated with heat radiation from hot shroud surfaces during operation of the device, an additional heat exchanger jacket can be mounted to cover the exterior surface of the shroud, the jacket having an inlet connected to the water source and an outlet connected to the heater coil inlet. The heat exchanger jacket can be provided in form of a spirally wound tube that is soldered or welded onto the tubular shroud, the jacket inlet being located closer to the front (discharge) end of the shroud. Thus, radiation heat, which may otherwise simply be lost towards the surroundings, can effectively be used to pre-heat the water before it enters the stream generator. Additionally, the jacket increases safety in that it covers the hot shroud.

Advantageously, the device can incorporate a vaporiser unit for converting liquid LPG into gaseous LPG prior to its delivery to the burner jet nozzle(s). In a simple embodiment, the vaporiser can take the shape of a u-bent tube of heat resistant but conductive material, one of the legs being connectable through suitable, thermally insulating coupling members to an LPG supply line, the other one of the legs receiving in sealing engagement a capillary tube with reduced bore diameter which acts as a discrete (i.e. no moving parts) gas flow metering member. The principles of such discrete metering members are explained in more detail in WO 98/01031 mentioned above, and reference should be made to that document for further details regarding regulation of gaseous LPG at the vaporiser. Where the capillary tube has a bore diameter that is small enough to generate a fuel delivery jet, no additional burner jet nozzle is required; otherwise, it is possible to incorporate such nozzle member at the free end of the capillary tube. Specific flow rate and discharge pressure values for gaseous LPG at the burner nozzle can be achieved through appropriate dimensioning of the vaporiser unit and burner nozzle components, depending on the combustion flame temperature and heat output required in a specific case, compare again WO 98/01031.

The inventive device can be incorporated in an agricultural implement for the thermal destruction of unwanted vegetation. Such agricultural implement can take a number of forms, e.g. a simple hand operated implement similar to that disclosed in above mentioned WO 96/03036. However, it should be noted that in contrast to the device disclosed there, the device of the present invention does not require forced air being fed into the shroud member (either by way of a fan or compressed air cylinders) to create a substantial volume flow of heated gases that leave the shroud outlet.

In yet a further aspect of the present invention, there is provided an agricultural implement for thermally destroying unwanted vegetation, in particular weeds and plant pests present on arable land, the implement incorporating a plurality of hot treatment fluid generation devices or units as described above the devices being arranged in batteries of spaced apart units that are mounted on a tool bar or support framework structure carried at the rear or front of a tractor or similar agricultural vehicle (in similar manner to the implements disclosed in U.S. Pat. No. 3,177,922 (Pardee), U.S. Pat. No. 3,543,436 (Baxter), or U.S. Pat. No. 5,030,086 (Jones), the contents of which, in so far as relevant to the method of mounting such devices and their accompanying infrastructure of water and LPG storage tanks on a self-propelled agricultural vehicle is concerned, are incorporated herein by way of short hand cross reference.

In yet a further aspect of the present invention, there is provided an agricultural implement for thermally destroying unwanted vegetation, in particular weeds and plant pests present on arable land, the implement incorporating a plurality of hot treatment fluid generation devices or units as described above, the units being mounted on a mobile surface contacting unit that can be drawn by an agricultural utility vehicle, the units being mounted in batteries on a support structure such as to direct the respectively generated hot treatment fluid jet streams into a plenum defined within an open bottom hood or applicator box structure, the box structure being held with small distance over the ground to be treated thereby to create a treatment zone substantially isolated from the surrounding environment and which treatment zone is moved at a predetermined travel speed during a ground treatment operation.

Preferably, the box structure includes a top plate in which are provided a plurality of openings corresponding in number to that of the units, the units being mounted with their tubular shrouds inclined with respect to the vertical such that the hot treatment fluid jet streams are directed in the travel direction of the agricultural vehicle. This measure increases the dwell time available to the treatment fluid before the hood clears the covered treatment zone.

In another embodiment, two batteries are arranged to intermesh in such a manner that fluid streams from adjacent units are directed in opposite, v-like directions.

The box structure can include a trailing apron of heat-resistant plastics or textile materials that is dragged over the treatment zone to lengthen the time before the treatment zone can exchange heat with the surrounding environment.

In a variation of the box-like hood structure, this structure can be entirely replaced by a simple, blanket-like apron made of heat resistant, light weight materials, e.g. fibreglass, that is dragged behind the hot treatment fluid generation unit batteries. In contrast to conventional flame cultivator implements that solely use hot gases to effect thermal damage of the vegetation to be destroyed, because of the better heat transfer capability of the hot treatment fluid, it is possible to simplify and reduce, if required, the size of the hood structure.

Hood and open bottom structures that can be used with the invention are disclosed in WO 98/03031 (Johnstone), U.S. Pat. No. 3,698,380 (Cook) and AU-A 42024/96 (Ecrowed), the contents of which are hereby incorporated by way of short hand reference.

A simple, hand-pushed hood construction is disclosed in AU-B 10256/83 (Morris). The device can be modified without difficulties to carry hot treatment fluid generation units in accordance with the invention.

Other applications of the invention include thermal defoliation using the hot fluid jet stream. To this end, it is possible to mount at the shroud discharge outlet a flexible, heat resistant hose which can selectively direct the hot fluid stream to a desired location.

Similarly, it is possible to use one or more hot fluid steam generation units for heating orchards and vineyards during days where there is a risk of light frosts. To this end, an elongated, conduit of substantial length, e.g. a non-insulated steel tube of 50 meters is connected to the discharge outlet of the unit (or to a manifold that is connected to a number of units), thereby to heatup the entire length of the conduit as heated fluid flows along its extension. The heat is radiated towards atmosphere and is sufficient to slightly increase ambient temperature in a zone about the tube and trees.

Similarly, a hot fluid generating unit (or a battery of such units) can be used to effect thermal fumigation of silos and tanks for holding produce and grains, disinfestation of grain piles and sterilisation of agricultural equipment and implements, including plant pots and fruit bins.

Embodiments of the present invention for use in exchange of conventional combustive flame treatment devices and implements will now be described, by way of illustrative example only, having reference to the accompanying drawings.

DESCRIPTION OF MODES TO CARRY OUT THE INVENTION

Figure 1:
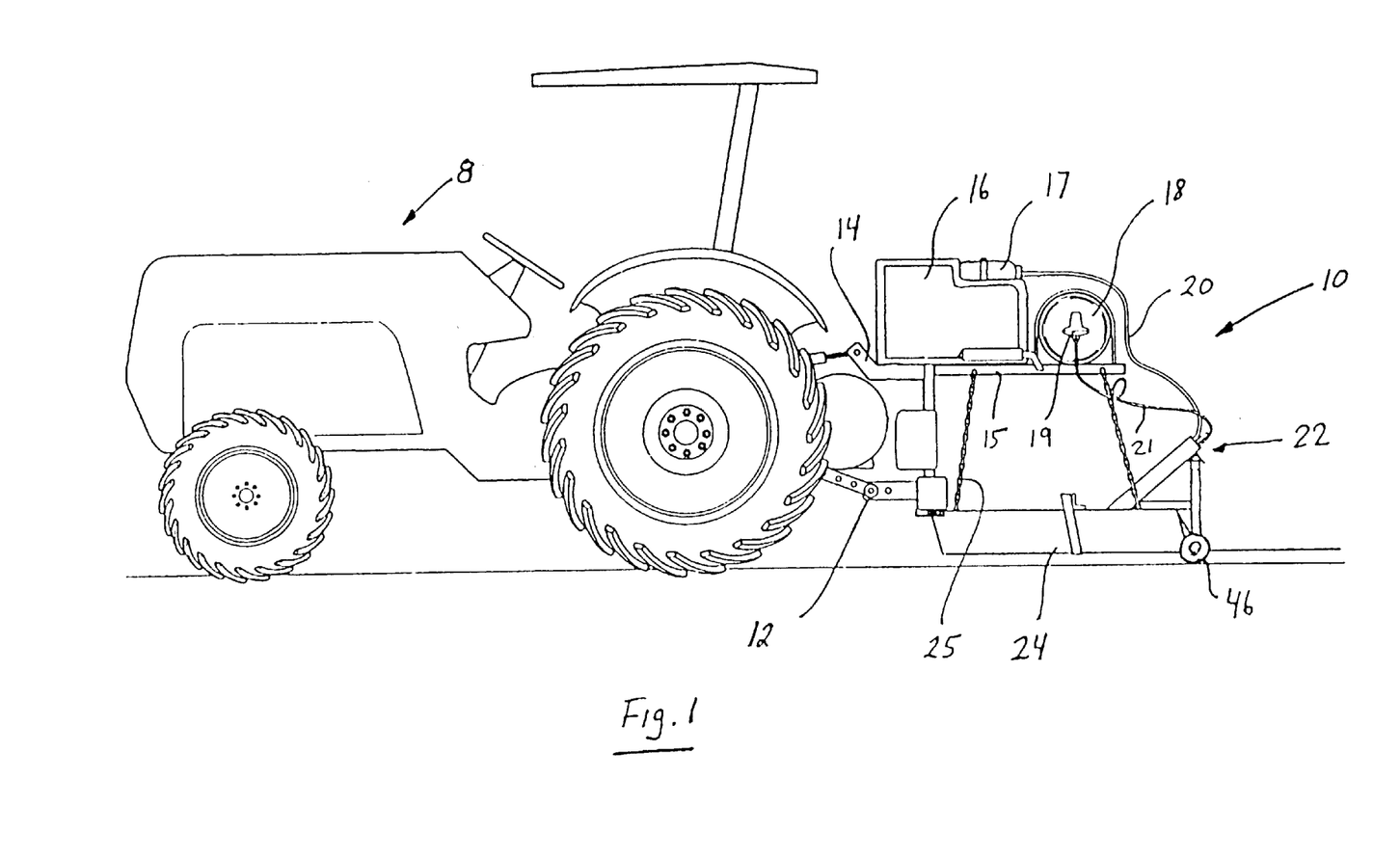
FIG. 1 is a schematic, side view of a weed and plant pest control implement which incorporates a number of hot treatment fluid generator units in accordance with the invention, mounted on the rear of and drawn by a tractor.
Figure 6:
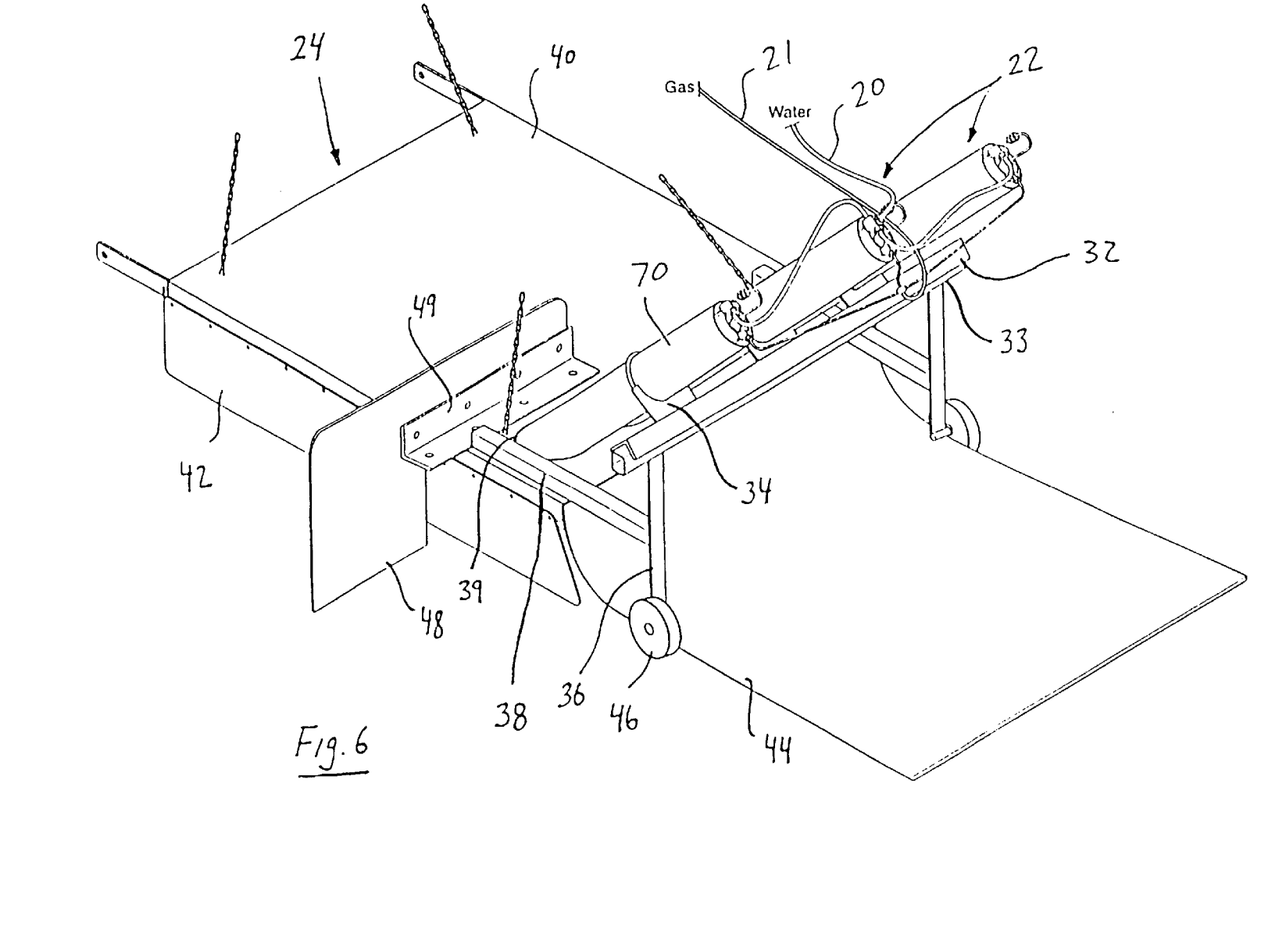
FIG. 6 is a perspective, simplified view of a canopy box used with the weed and plant pest control implement of FIG. 1 and showing in greater detail the mounting arrangement for three treatment fluid generator units as shown in FIG. 2.
Figure 7:
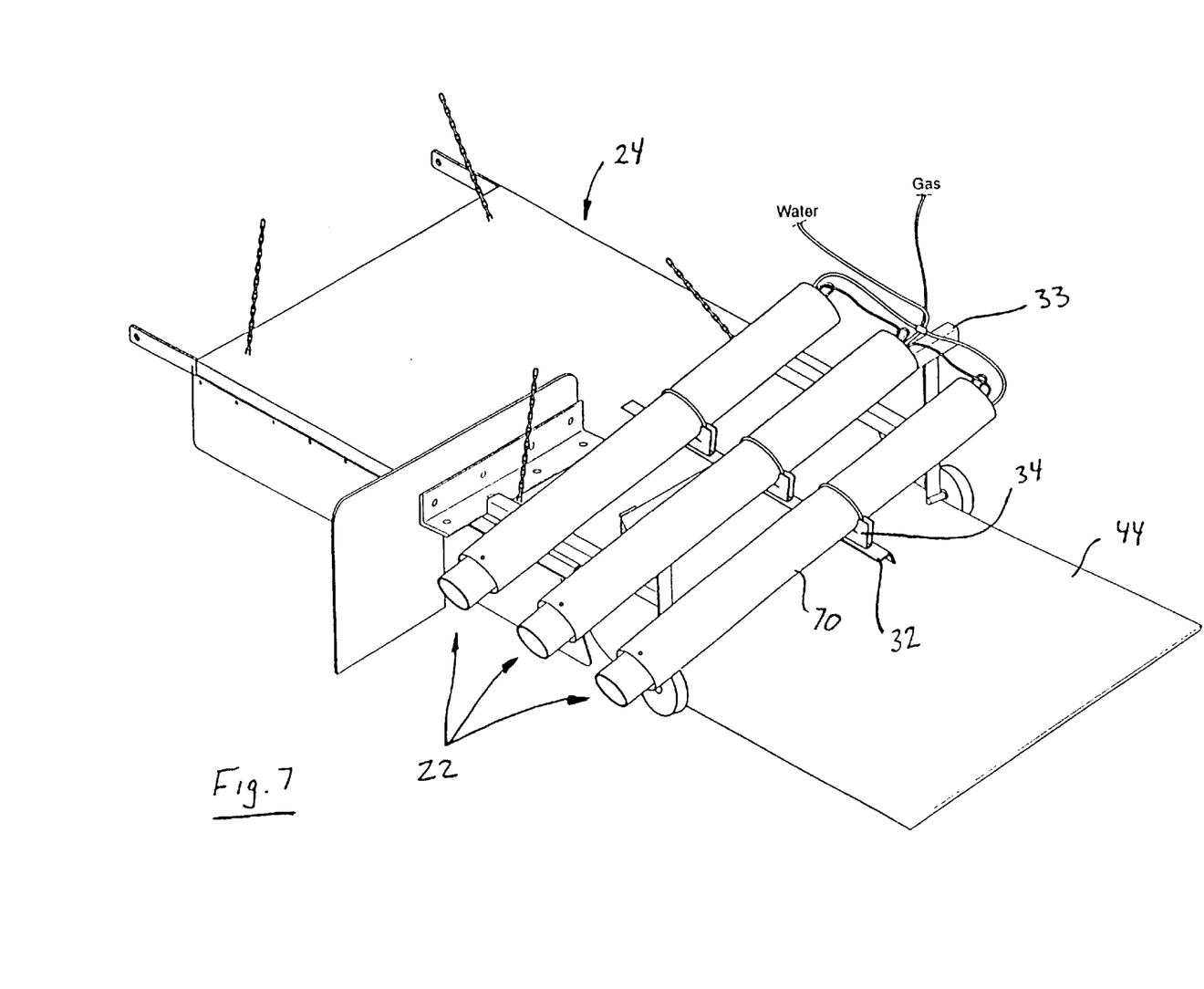
FIG. 7 shows the canopy box illustrated in FIG. 6 with the battery of hot treatment fluid generator units rotated to discharge the hot treatment fluid sideways of the canopy box instead of into the open plenum underneath the canopy box.

Having reference first to FIGS. 1, 6 and 7, there is shown a weed and plant pest control implement 10 which can be mounted on the rear of a farm tractor 8 using suitably shaped tractor hitching and pivot bars 12, 14. These enable implement 10 to be lifted from the ground and be lowered to be drawn behind the tractor during treatment of a weed-infested area. Implement 10 includes a support tray or platform 15 on which are received a 200 litre water storage tank 16 with integral water pump 17 and an LPG storage cylinder 18 with integral outlet valve appliance 19. Water tank pump 17 is designed to provide a metered flow of water, e.g. bore or dam water, at delivery pressures of about 80 Psi. Water tank 16 and LPG cylinder 18 are suitably secured onto tray 15 to avoid displacement thereof during travel of tractor 8. Specific structural details on how implement 10 is secured for lowering and raising with respect to the ground are omitted from FIG. 1, as they do not form part of the invention.

Suspended from tray 15 by way of four chains 25 is an applicator hood or canopy 24 which in essence is an open-bottom, rectangular box structure that can be additionally connected to linkage bar 12 in a manner not illustrated in further detail. Applicator hood 24 incorporates surface contacting wheels 46 thereby to maintain a predetermined (or adjustable) clearance gap towards the ground to prevent creation of furrows in the ground over which implement 10 is drawn.

Hood 24 is comprised of a top plate 40 made of heat resistant sheet metal of suitable thickness. Side skirts 42 of heat-resistant sheet metal, fibre glass, or silicon-rubber materials are fastened on both lateral edges of top plate 40. A front end skirt plate (not illustrated) is fastened on the leading edge of plate 40 whilst the rear opening of hood 24 is closed by a trailing apron 44 made of heat resistant plastic or textile materials, thereby to create a plenum inside the box structure that is open only towards the ground and otherwise insulated from the outside environment.

As is further illustrated in FIGS. 1, 6 and 7, implement 10 further incorporates a battery of treatment fluid generator units 22 (hereinafter simply referred to as generator units) that are supplied through respective manifold lines 20, 21 with water and liquid LPG from water container 16 and gas cylinder 18, respectively. Units 22 generate a hot treatment fluid which substantially consists of hot LPG combustion gases, heated surplus air and water in form of dry or superheated steam, as will be explained in more detail below. Not illustrated, suitable flow regulators may be incorporated in the manifold lines 20, 21 to allow control of fluid delivery to the individual generator units 22. The battery or array of generator units 22 is supported on hood 24 such as to direct individual jet streams of fluid having an application temperature of preferably around 450° C. towards the ground to thermally destroy unwanted vegetation, in particular weeds, and other plant pests that may adversely affect useful crop plants like cotton, vines and the like.

The individual generator units 22 of the battery, which have a generally cylindrical tubular appearance, are removably mounted in spaced apart relationship along the extension of a straight mounting bar (L-section) 32 with their longitudinal axes extending substantially perpendicular to the longitudinal axis of mounting bar 32. The units are secured onto bar 32 using conventional U-shaped fastening bolts 34 that engage over the tubular housing shrouds 70 of the units in known and therefore not further illustrated manner.

Two horizontal bar members 38 are welded on top plate 40 so as to extend in rearward extension thereof. At the terminal ends of each horizontal bar member 38 is welded an upright extending leg beam 36, each of which carries at its lower end a suitable bearing for mounting the aforementioned ground engaging wheels 46. A square hollow section bar 33 braces the upper terminal ends of upright beams 36. Bar 33 provides a support or receptacle on which the battery of units 22 can be removably secured in two distinct positions.

In the first position, mounting bar 32 of the battery is located to extend parallel on receptacle bar 33 and fixedly secured thereon by way of bolts or other type of releasable fastening members (not shown). In this position, the tubular generator units 22 extend with their longitudinal axes inclined with respect to the ground and facing in a forward direction with respect to the trailing apron 44. The forward ends of the tubular generator units 22 are hereby received with minimal radial clearance gap in appropriately shaped apertures 39 in top plate 40 so that they can discharge the hot treatment fluid they generate into the plenum formed within hood 24.

In the second position, mounting bar 32 is secured with its longitudinal axis extending perpendicular to support bar 33, thereby enabling the preferably equidistantly spaced apart units 22 to direct the treatment fluid to a lateral zone adjacent to the side of hood 24, as seen in FIG. 7.

An L-section 49, suitably fastened on top plate 40, supports an elastic defection skirt made of heat-resistant plastics or metallic materials which serves to protect the battery of generator units 22 from being damaged by hard objects during movement of applicator hood 24 when the battery is supported thereon in the second position illustrated in FIG. 7, and also acts as a wind break.

Figure 2:
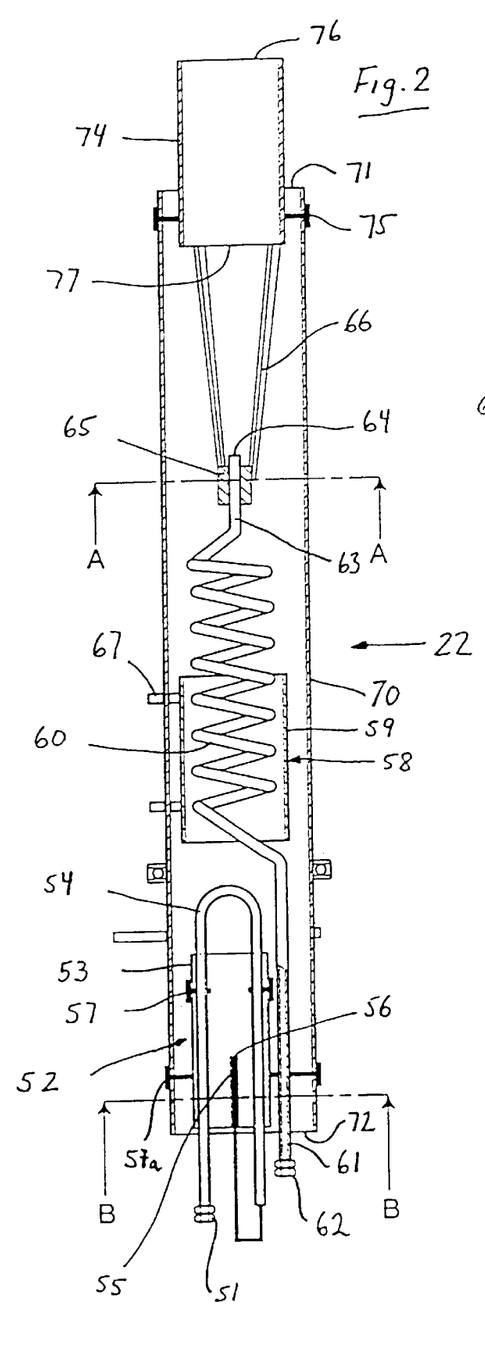
FIG. 2 is a longitudinal, enlarged section showing details of one of the hot treatment fluid generator units as employed in the weed and plant pest control implement of FIG. 1.
Figure 3:
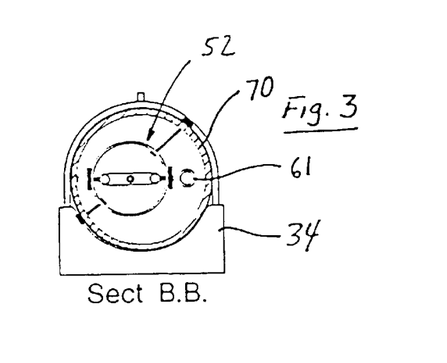
FIG. 3 is a cross-section taken along line B—B of FIG. 2.
Figure 4:
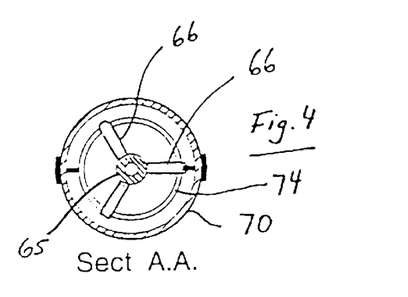
FIG. 4 is a cross-section taken along line A—A of FIG. 2.

Turning now to FIGS. 2 to 4, there is illustrated a first embodiment of unit 22 for generating the hot, weed killing fluid. Unit 22 includes a tubular housing shroud 70 made of heat-resistant stainless steel and having a wall thickness of about 1.6 mm, a length of about 700 mm and a diameter of 100 or 125 mm. Received within the forward facing opening 71 of shroud 70 in co-axial alignment is a discharge tube 74 of similar material to that of shroud 70, but having a reduced diameter of 75 mm and a length of about 95 mm, which is secured within the forward part of shroud 70 by any type of suitable fixed distance holding spacers welded to the tubes, or in removable manner using suitable high temperature resistant bolts 75.

Received within the rear open section of shroud 70 is a combined vaporiser and LPG burner unit 52 which has a tubular housing 53, made from high-temperature resistant stainless steel with a wall thickness of 1.6 mm, a diameter of about 50 mm and a length of about 130 mm. Housing 53 is fully received within and removably fixed with respect to shroud 70 using high temperature resistant fastening bolts 57a such that an (irregular) annular opening 72 is maintained between the facing surfaces of shroud 70 and tubular housing 53, compare FIG. 3.

Within housing 53 is received a u-shaped metal tube of 6.4 mm bore diameter that forms part of the LPG fuel vaporiser. Tube 54 is removably secured by way of high-temperature resistant mounting members 57 to shroud 70. The u-end of tube 54 protrudes forward through the front opening of housing 53, whilst one of the rearward extending tube legs is fitted with a suitable coupling member 51 that permits pressure and leakage-proof connection of tube 54 with an LPG manifold line 21 (shown in FIG. 1). Received and brazed within the other tube leg that is bent such as to protrude with its forward or distal free end into housing 53, is a metallic capillary metering tube 55. The orifice at the front end of the 0.9 mm bore metering tube 55 is disposed to direct a stream of LPG coaxially into housing tube 53. The free end of capillary tube 55 can be (but need not be) fitted with a burner nozzle having an appropriately sized orifice for delivering a high velocity gaseous LPG jet into housing 53 (which serves as a burner shroud) such as to generate a high temperature jet flame once the LPG supplied from the manifold line through tube 54 and metering capillary 55 has been ignited. The length of and bore diameter of capillary tube 55 are chosen so that this element acts as a discrete pressure reduction member thereby to dispense with conventional adjustable metering and flow regulating members. Once steady operation state of burner unit 52 has been achieved, enough gaseous LPG will be generated within vaporiser tube 54 and delivered in metered flow by capillary tube 55 to the burner orifice 56 to sustain a jet flame. A non-illustrated piezzo lighter may be suitably located and secured within burner shroud 53 to effect ignition of the burner. Other known LPG ignition systems can also be used.

A simple steam generation unit 58 is located within shroud tube 70 in forward, downstream location of burner unit 52. It includes a tubular housing 59 made of high-temperature resistant stainless steel with a wall thickness of 1.6 mm, a diameter of 75 mm and a length of 110 to 140 mm. Steam generator housing 59 is secured at shroud tube 70 using high-temperature resistant mounting bolts 67 so that it extends substantially coaxially with tubular burner housing 53. A metallic steam generator coil 60, made of smooth or spirally corrugated tubing of 1.65 mm wall thickness with an outer diameter of 6.4 mm and having about 15 turns within a 60 mm outer envelope, is received coaxially within tubular housing 59. A rearward extending straight tube portion 61 of coil 60 passes through the annulus between tubular burner housing 53 and the tubular housing shroud 70 and is fitted at its terminal end with a suitable coupling nut 62 for sealing connection to the water manifold line 20 shown in FIGS. 1, 6 and 7. A forward extending straight tube portion 63 of coil 60 is glidingly received within a collar mount 65 which is fixed at a tripod support 66 welded to the outside of discharge tube 74 such as to extend in rearward extension thereof. Collar mount 65 and tripod support 66 secure the forward free end of tube portion 63 with its terminal outlet 64 in coaxial alignment within tubular shroud 70 and with respect to discharge tube 74. This type of support structure is primarily intended to prevent excessive vibrations of the forward tube portion 63 during emission of the hot steam jet stream during operation of unit 22.

Operation of the hot fluid generation units 22 of implement 10 is as follows. Fuel supply to all vaporiser units 52 is established by opening the outlet service valve 19 at LPG cylinder 18, whereupon LPG in liquid form is delivered under tank pressure (depending on ambient temperature) to the manifold gas line 21 at between 80 to 135 Psi. To avoid pressure variations a regulating valve is used to set delivery pressure to each vaporiser tube 54 at about 80 Psi. Where the implement comprises a larger number of units 22 than illustrated (e.g. up to 32 units in banks or clusters of 8 each, wherein two 8-unit clusters are mounted parallel behind one another), it is desirable to have shutter or regulator valves arranged in the fuel supply line of individual units or to have a simple regulator valve serving a battery of units 22. For a short period of time, liquid LPG will vaporise freely as it exits under tank pressure from jet orifice 56 of capillary metering tube 55 into burner shroud 53, since sufficient vaporisation heat can initially be extracted from the zone surrounding the capillary tube. This time period may last several seconds. During this time, it is easy to ignite the fuel with the piezzo igniter, as gaseous LPG is more readily ignitable than when in its liquid state. Once each burner 52 has been ignited, heat will be transferred into the respective vaporiser tube 54, thereby ensuring subsequent gaseous fuel supply in discretely metered manner via capillary tubes 55 and jet orifices 56. The fuel will be supplied at sufficient pressure to create a jet flame. Combustion air supply is mainly via the rear opening 72 of tubular shroud 70 in self-aspirating mode.

Once the burner units 52 operate in steady state, water supply to the steam generator units 58 of units 22 is turned on, whereby water is supplied via manifold line 20 from tank 16 under line pressure of about 80 Psi (provided by pump 17) to all units 22. Suitable flow regulators (either adjustable or fixed) may be incorporated in the water supply lines to individually adjust water flow rate and pressure to individual units 22. The amount of water delivered to each unit 22 can be set independently of on the amount of moisture that is required to be incorporated into the hot treatment fluid generated by the units 22 and the temperature that the treatment fluid is to have. LPG combustion flame energy contents will vary depending on the amount of fuel and air supplied to the burner as well as, to a certain extent, burner nozzle configuration, the temperature range being roughly 950° C. to 1200° C. Allowing for heat transfer losses, it is preferred for the treatment fluid (air, combustion gases, steam) to leave the discharge tube 74 at temperatures of between 350° C. and 450° C., which is below the self-ignition temperature of common grasses and weeds. It has been established in trials of hot treatment fluid generation units 22 having a single 80 Megajoule burner 52 that a constant water supply of between 8 and 14 liter per hour will achieve an outlet discharge temperature of around 450° C., depending on initial water temperature.

The steam generator units 58 are devised and dimensioned in such a manner that the combustion flames of burner units 52 will generate wet or saturated steam. The steam is discharged in form of a somewhat divergent jet stream through jet orifice 64 towards discharge tube 74. This "blast" or jet stream of steam will create a considerable draught (i.e. low pressure) within tubular shroud 70, thereby aspirating sufficient air through the rearward shroud opening 72 (which therefore represents a breather aperture) to not only provide the combustion air required by the burners, but also additional air which is heated by the combustion gases as it flows through shroud 70 towards discharge tube 74. It has been observed that air is also aspirated into shroud 70 through the annular void at forward opening 71 in counter-flow to the stream of hot fluid exiting unit 22. It has been noted that this annular counter stream partly cools the forward section of the walls of shroud 70 and discharge tube 74.

Upon being discharged into the cavity formed between discharge tube 74 and steam generator unit 58 within shroud 70, which forms a mixing chamber, the jet stream of wet and/or saturated steam is further heated as it comes in direct contact with the hot combustion gases, and dry and partly superheated steam is thus generated. Accordingly, the treatment fluid that exits the unit is essentially comprised of combustion gases, hot air, and water vapour in dry or superheated state. It has been observed that the temperature of such treatment fluid will still be around 300° C. to 350° C. hot at the end of an insulated, 5 meter long tube mounted in extension of outlet tube 74, which is an indication of the good heat retention qualities such treatment fluid posses while being conveyed over longer distances from the generator unit 22. Also, the heat cone of the expelled treatment fluid is substantially wider than is the case where combustion gases and hot air alone form the treatment fluid.

It will be appreciated that the actual amount of heat that is transferred into the treatment zone located beneath hood 24 of implement 10 will depend on the number of units 22 mounted thereon, heat density gradients within the plenum of hood 24 being a function of the separation distance between adjacent units 22 and the orientation in which the hot treatment fluid is directed towards the ground, an interleafing arrangement of units 22 disposed to direct treatment fluid streams in opposing, v-configuration being preferred.

Figure 5:
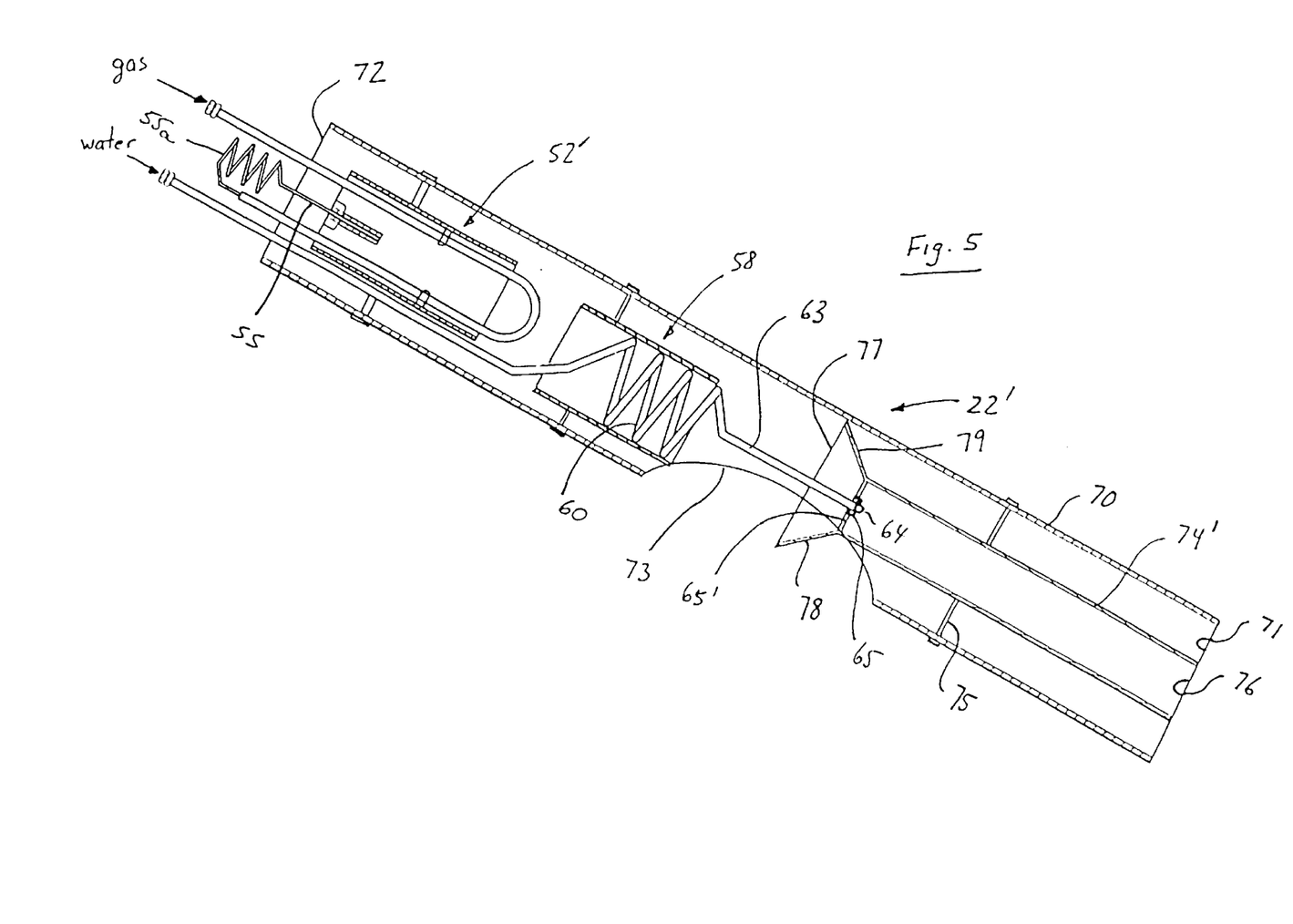
FIG. 5 is a longitudinal section of an alternative embodiment of the hot treatment fluid generator unit employed in the weed and plant pest control implement of FIG. 1.

FIG. 5 illustrates a modified unit 22', and same reference numerals have been used there as in FIGS. 2 to 4, to denote similar components. The combined vaporiser-burner unit 52' is essentially identical to that of the previously described embodiment, the capillary metering tube 55, however, incorporating a coiled portion 55a located outside the tubular shroud 70. Coiled portion 55a serves as a cooling section to avoid overheating of LPG gas during operation of the burner 52', but similarly assists in the vaporisation of liquid LPG where the vaporiser tube is under-heated.

Shroud 70 has a cut-out 73 in the wall of its middle region forward of the steam generator unit 58. Cut-out 73 serves as an additional air inlet (breather opening) for the modified discharge tube 74'. Modified discharge tube 74' is fully received within and is fixed in coaxial alignment with shroud 70 by means of four releasable fastening bolts 75 that extend radially between the two components. The forward end of straight tube portion 63 of steam generation coil 60 is received within a tapered or flared skirt portion 78 of discharge tube 74' and appropriately secured against radial movement by a mounting bush 65 held coaxially within tube 74' by four radial webs 65' welded to bush 65 and tube 74'. Discharge outlet 64 of coil 60 is arranged to deliver the steam jet stream directly into tube 74'. It will be further noted that flared portion 78 has a maximum diameter that substantially corresponds to the inner diameter of shroud 70, a plurality of equiradially distanced and equiperipherally separated apertures 79 permitting gas passage from the rear opening 77 of tube 74' towards the front of shroud 70 for exiting through the annular front opening 71.

Essentially, the modified unit 22' includes a venturi that induces gas flow within shroud 70 (by means of discharge tube 74' to generate the hot treatment fluid). The stream of hot water vapour discharged into tube 74' will create a venturi effect that allows aspiration of secondary air through cut-out 73 into tube 74' as well as into the annular void formed between tube 74' and shroud 70. With such arrangement, two distinct flow zones are created, an annular outer zone that delivers a fluid essentially consisting of aspirated cooler air mixed with combustion gases, and a circular core zone that delivers a fluid essentially consisting of combustion gases, heated air, secondary air as well as water vapour, which is converted into dry steam prior to reaching the discharge opening 76 of tube 74'.

Figure 8:
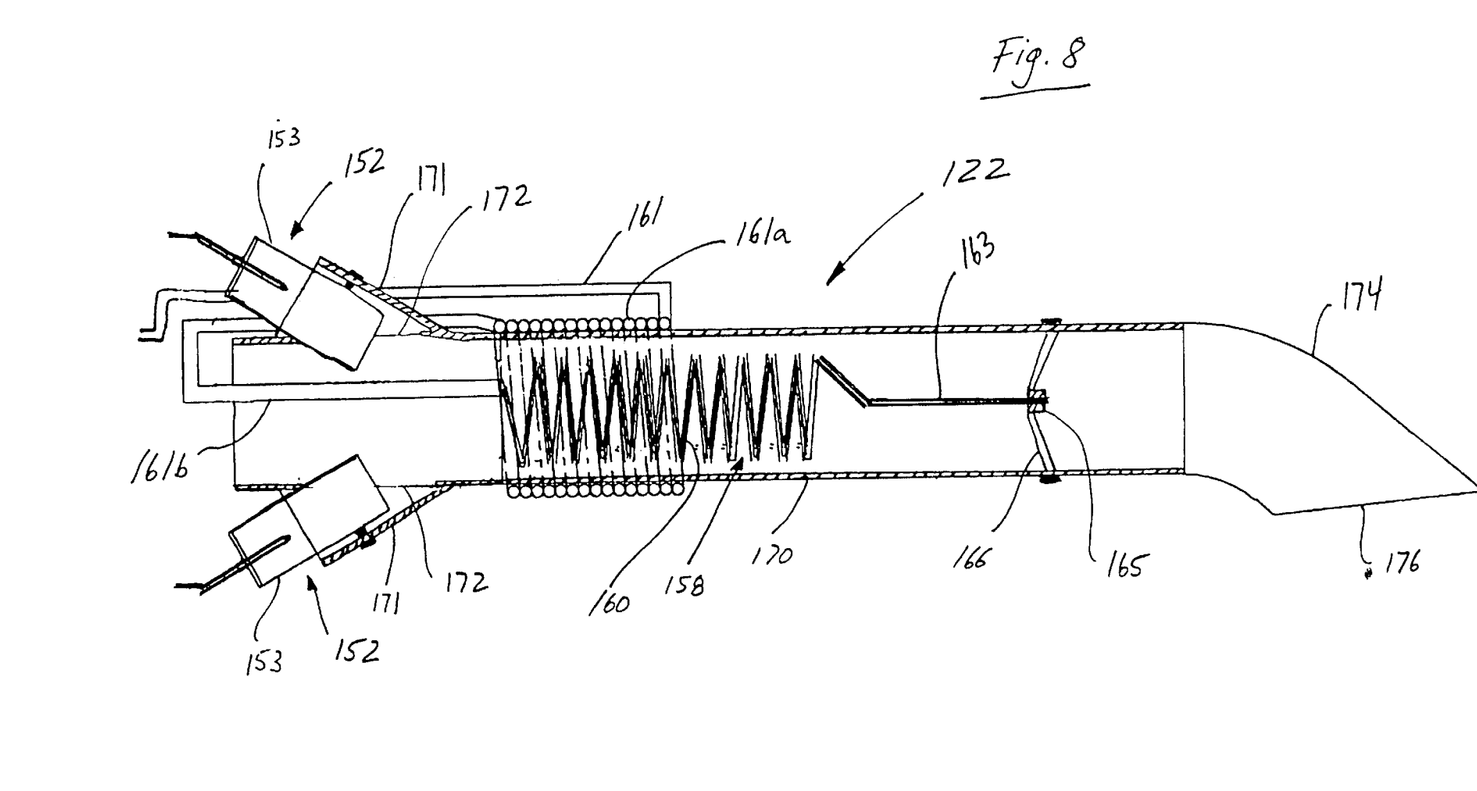
FIG. 8 is a schematic, longitudinal section of yet a further embodiment of a hot treatment fluid generator unit in accordance with the invention.

FIG. 8 is a highly schematic illustration of another, modified treatment fluid generator unit 122 in accordance with the present invention. The housing shroud 170 is a 150 mm diameter stainless steel tube having a length of about 600 mm. A discharge elbow 174 which serves as a stream deviator is welded to the front terminal end of housing shroud 170.

At 152 are shown in schematic illustration two of four burner units, which are in construction similar to those described above and as illustrated in FIG. 2 or FIG. 5, the burners 152 being mounted and secured to the outside of tubular shroud 70 (within half-conus shaped skirts 171 protruding from the cylindrical outer surface of shroud 170) equiradially spaced from the longitudinal axis of the shroud 70, equidistantly spaced apart around the periphery of shroud 170 and with the tubular burner housings 153 enclosing an acute angle between their respective longitudinal axis and the longitudinal axis of shroud 170.

The discharge openings of burner shrouds 153 extend partly through properly sized openings 172 in the peripheral wall of housing shroud 170 such that the respective combustion flames converge inside housing shroud 170 towards steam generator coil 160 of modified steam generator unit 158 received within housing shroud 170.

Steam generator coil 160 is preferably made of a helicaly corrugated high temperature stainless-steel tube, the straight, terminal (discharge) portion 163 being radially secured in retention collar 165 which is fixed within the mixing chamber of housing shroud 170 by four support legs 166 in similar fashion as was described above in connection with FIG. 5.

Steam generator 158 also includes a preheater section 161a consisting of a number of coil turns brazed/welded in heat-conducting fashion onto the outside surface of housing shroud 170 and located in a zone where the highest heat concentration generated by burner units 152 is present. Water supply line 161 is connected in known manner to the forward most end of preheater section 161a such that water passes preheater section 161a in counter-flow before passing through connecting tube section 161b into the high temperature section 160 of steam generator 158.

Operation of treatment fluid generator unit 122 is very similar to the units described above, but its lay-out with four burner units has certain advantages. Firstly, by providing four burner units for one, higher through-put steam generator unit, it is possible to simplify the ignition and pilot flame (if included) lay-out, as the burners can cross-light in case of individual burner blow-outs. Also, it is possible to utilise high-capacity steam generators allowing greater through-put of water (and thus heat energy up-take) as compared to single-burner units. By using a steam-generator pre-heater section that surrounds the housing shroud it is possible to make use of part of the radiation heat that the hot tubular housing shroud surface emit and that otherwise would be lost to atmosphere. This measure also increases operational safety, as the pre-heater section covers part of the hot outside surface of the housing shroud. The pre-heater section can be arranged to cover most of the housing shroud, if desired, bearing in mind water pressure drops. In essence, the pre-heater section thus acts as a cooling-jacket for part or all of the housing shroud.

Another advantage of such modified treatment fluid generator unit is evident when such units are used in a motorised agricultural implement as illustrated in FIG. 1. The space required for four (4), 150 mm Ø, four-burner generator units 122 is reduced as compared to sixteen (16), 100 mm Ø, single burner generator units 22, the total heat output from the burners being the same. The same amount of heat can be delivered to a more focused area or a higher heat amount to the same surface area than is the case with a one-burner unit. The water flow control of 16 individual steam generators fed from a common source and heated by individual burners can be substantially simplified when using only four steam generators (having about the same capacity as the 16 generators of the individual units), particularly in case of a torch-out of individual burners. Such torch-out affects the even distribution of water amounts to the individual units (due to back-pressure variations in the supply lines to individual units). Also, heat losses of a single unit with four burners can be minimised as compared to four units (assuming same insulation expenditure).

It has also been found with a stationary treatment fluid generator unit having four burners that up to 100 l/h of water can be fed effectively. This allows for attachment of a e.g. 150 m long "heat distribution pipe", for orchard heating purposes, the temperature drop between pipe inlet and outlet being about 300° C. to 350° C., and the unit producing enough mass flow of heated fluid (combustion gases, secondary air and water vapor) to raise the temperature of the pipe to a level where enough heat is radiated therefrom into the surrounding ambient air to prevent frost damage to the orchard trees during mild frost conditions.

The described agricultural implement 10 and the specific embodiments of the hot treatment fluid generator units 22 are representative of but not limiting to the invention described herein. Modifications of the disclosed embodiments that would be a matter of routine for the skilled worker in the field, are also to be regarded as forming part of the invention in so far as claimed hereinafter.

What is claimed is:

1. A method of destroying or controlling unwanted vegetation and agricultural pests, including the steps of:

generating a hot precursor gas substantially comprising combustion gases using at least one hydrocarbon fuel burner, the hot precursor gas being generated within a housing that has a breather inlet, a mixing chamber and a discharge outlet;

generating a hot precursor fluid that includes wet steam, saturated steam or mixtures thereof, the hot precursor fluid being generated within a steam generator that is connected to a water source and heated by at least one of the combustion gases and the at least one burner;

discharging the hot precursor fluid into the mixing chamber of the housing and further heating the precursor fluid through direct heat exchange and mixing with the combustion gases to obtain a hot treatment fluid in which a water component thereof substantially comprises at least one of superheated steam and dry steam;

generating a treatment fluid jet stream by inducing the hot treatment fluid to flow within and exit the discharge outlet of the housing as a jet stream; and applying the treatment fluid jet stream onto a treatment area to thereby thermally destroy unwanted vegetation and agricultural pests.

2. A method according to claim 1, wherein the jet stream of the hot treatment fluid is generated by pressurizing and expelling the hot precursor fluid through a jet orifice at the steam generator into the mixing chamber in a direction generally towards the discharge outlet of the housing.

3. A method according to claim 2, further including the step of aspirating surplus air into the mixing chamber, heating the aspirated air and mixing the aspirated air with the hot treatment fluid to increase the mass of hot gas in the treatment fluid that is expelled through the discharge outlet of the housing.

4. A method according to claim 1, wherein the hydrocarbon fuel is liquefied petroleum gas (LPG).

5. A device for generating a hot fluid stream for space and object heating purposes, comprising:

at least one burner connectable to a fluid hydrocarbon fuel source and arranged to generate a combustion flames and combustion gases;

a hollow housing having at least one breather opening enabling air entry into the housing, a mixing chamber and a discharge outlet for delivery of the hot fluid stream, the at least one burner being mounted to the housing such that the combustion flames extend into and combustion gases are delivered to the mixing chamber; and means for delivering water into the mixing chamber and for moistening the combustion gases prior to discharge of the combustion gases through the discharge outlet; wherein said means for delivering water includes a steam generator unit disposed within the housing to be heated by at least one of the combustion flames and the combustion gases, the steam generator unit being arranged to generate wet and/or saturated steam and to deliver a jet stream of wet and/or saturated water steam into the mixing chamber in a direction generally towards the discharge outlet of the housing, and wherein the mixing chamber is arranged to enable mixing of the jet stream of water steam, combustion gases and air aspirated into the mixing chamber and transformation of the wet and/or saturated steam into dry steam, superheated steam or mixtures thereof through direct heat exchange with the combustion gases prior to the hot fluid stream created by said mixing and further heating being discharged through said discharge outlet.

6. A device according to claim 5, further including means for generating a partial vacuum inside the mixing chamber to aspirate surplus air into the mixing chamber.

7. A device according to claim 6, wherein said means for generating a partial vacuum includes a venturi body formed by or within the housing.

8. A device according to claim 6, wherein said means for generating a partial vacuum includes said steam generator unit, the steam generator unit being arranged to deliver said jet stream of wet and/or saturated steam at high speed and pressure towards the discharge outlet of the housing and create a draught air flow past the breather opening into the mixing chamber.

9. A device according to claim 5, wherein the steam generator unit includes a tubular coil element having a predetermined number of coil turns sufficient to ensure that water entering the coil, at a given flow rate and temperature, is heated by the combustion flame of the at least one burner and is converted into said wet and/or saturated steam.

10. A device according to claim 5, further comprising a cooling jacket at least partially surrounding the housing.

11. A device according to claim 10, wherein the cooling jacket is in fluid communication with the steam generator unit and is arranged to form a pre-heating section thereof.

12. A device according to claim 5, wherein the steam generator unit includes a coil made of a helically corrugated tube.

13. A device according to claim 5, further comprising a vaporizer unit for converting liquid liquefied petroleum gas into gaseous liquefied petroleum gas, the vaporizer unit being configured to be heated by the combustion flames of the at least one burner.

14. A device according to claim 5, wherein the at least one burner includes a fuel jet delivery nozzle configured to generate high-velocity combustion flames.

15. An agricultural implement for thermally destroying unwanted vegetation, comprising a tool bar or support framework structure arranged for mounting on a self-propelled agricultural vehicle or to be drawn by such self-propelled agricultural vehicle, and a plurality of hot treatment fluid generation devices as claimed in claim 5, the devices being mounted onto the tool bar or support framework structure in one or more batteries in spaced apart relationship to one another.

16. An agricultural implement for thermally destroying unwanted vegetation, comprising a support structure configured to be towed by an agricultural utility vehicle, an open bottom hood or applicator box structure suspended from the support structure, the box structure being held a small distance above the ground to be treated and enclosing a treatment zone substantially isolated from the surrounding environment, and a plurality of hot treatment fluid generating devices as claimed in claim 5, the devices being disposed in one or more batteries in spaced apart relationship to one another and mounted on the support structure such as to direct the respective hot treatment fluid jet streams generated by each device into a plenum defined within the box structure.

17. An agricultural implement according to claim 16, wherein the box structure includes a top plate having a plurality of openings which correspond in number to the hot treatment fluid generating devices, the devices having a tubular shaped housing and being mounted with their tubular housings inclined with respect to the vertical such that the hot treatment fluid jet streams are directed in or against a travel direction of the agricultural vehicle.

18. An agricultural implement according to claim 17, wherein two batteries of said laterally spaced apart hot treatment fluid generating devices are arranged to intermesh in such a manner that the hot treatment fluid streams from adjacent units are directed in opposite directions, either converging or laterally parallel, to form a substantially "v" like shape.

19. An agricultural implement according to claim 16, wherein the hood like box structure includes a trailing apron of heat-resistant plastics or textile materials that is dragged over the treatment zone to lengthen the time before the treatment zone can exchange heat with the surrounding environment.

20. A method of thermally fumigating silos and tanks in which agricultural produce, including grains, are stored, comprising:

provide a device according to claim 5; and supplying a hot fluid stream discharged from the outlet of the device into the silo or tank for a period of time period sufficient to effect thermal fumigation of the agricultural produce received therein.

21. A method of thermally sterilizing agricultural equipment and implements, comprising:

providing a device according to claim 5; and applying a hot fluid stream discharged from the outlet of the device to the agricultural equipment or implement for a period of time period that is sufficient to effect thermal sterilization of said equipment.

22. A method for heating of orchards and vineyards, comprising:

providing at least one device according to claim 5; and directing at least one hot fluid stream from the at least one device into a non-insulated conduit of substantial length that is disposed to form a zone about vines or trees to slightly increase the ambient temperature in the zone about vines or trees by heat radiation.

23. A device according to claim 5, wherein the housing is of tubular configuration, wherein the steam generator unit is arranged within the tubular housing and includes a coil element of predetermined length and coil windings configured to convert water entering into the steam generator at a given flow rate and temperature into said wet and/or saturated steam, wherein the at least one burner is arranged within the tubular housing such that the combustion flames heat the steam generator, and wherein the delivery outlet of the steam generator is located within the mixing chamber at a distance from the discharge outlet of the housing sufficient to enable mixing of the wet and/or saturated steam jet stream with the combustion gases of the at least one burner and said transformation of the wet and/or saturated steam into at least dry steam prior to delivery of the hot fluid stream past the discharge opening.

24. A device according to claim 23, wherein the at least one burner includes a fuel delivery nozzle arranged for generation of high-velocity combustion flames.

25. A device according to claim 23, further comprising means for aspirating air into the mixing chamber.

26. A device according to claim 25, wherein the said means for aspirating air into the mixing chamber comprise the at least one burner having a fuel delivery nozzle arranged for generation of high-velocity combustion flames, and wherein the delivery outlet of the steam generator is arranged for delivery of the jet stream of wet and/or saturated steam, whereby in operation of the device, discharge of the hot fluid jet stream creates a draught within the housing from the breather opening towards the discharge outlet.

27. An agricultural implement for thermally destroying unwanted vegetation, in particular weeds or plant pests, in vineyards, comprising a tool bar or support framework structure arranged for mounting on a self-propelled agricultural vehicle or to be drawn by such self-propelled agricultural vehicle, one or more devices for generating a hot treatment fluid in accordance with claim 23 or 26, the devices being mounted on the tool bar or support framework structure in lateral spaced apart relationship, with a respective longitudinal axis of the devices directed in a sideways and downward inclined direction with respect to the travel direction of the vehicle, one or more liquefied petroleum gas cylinders carried on the vehicle, liquefied petroleum gas supply lines connecting the liquefied petroleum gas cylinders to the burners of the devices for generating the hot treatment fluid, and a water storage tank carried on the vehicle, water supply lines connecting the water storage tank to all steam generators of the devices for generating the hot treatment fluid.

28. A method of destroying or controlling unwanted vegetation and agricultural pests, comprising:

generating a hot precursor gas substantially comprising combustion gases from at least one hydrocarbon fuel burner;

generating a hot precursor fluid consisting essentially of wet water steam, saturated water steam or mixtures thereof, the hot precursor fluid being generated in a steam generation unit that is connected to a water source and is heated by at least one of the at least one burner and the hot precursor gas;

generating a hot treatment fluid having a water component substantially comprising at least one of superheated steam and dry steam by discharging the hot precursor fluid into a mixing chamber of a hollow housing and mixing same therein with the hot precursor gas; and discharging a jet stream of said hot treatment fluid through a discharge outlet of the housing and applying same onto a treatment area to thermally destroy unwanted vegetation and agricultural pests.

29. A method according to claim 28, wherein the hot precursor gas is generated within the hollow housing and the steam generation unit is located within the hollow housing.

30. A method according to claim 29, wherein the hot precursor gas is generated using burner gas nozzles arranged to create high velocity combustion flames, the nozzles being oriented to discharge hydrocarbon fuel in a direction generally towards the discharge outlet of the hollow housing.

31. A method according to claim 28, wherein the hollow housing is tubular in configuration, wherein the hot precursor gases, the hot precursor fluid and the hot treatment fluid are generated within the tubular housing, and wherein the discharge outlet is provided at an open end of the tubular housing.

32. A method according to claim 28, wherein the jet stream of the hot treatment fluid is generated by pressurizing and expelling the hot precursor fluid through a jet orifice at the steam generator into the mixing chamber in a direction generally towards the discharge outlet of the housing.

33. A method according to claim 32, wherein water is delivered at line pressure to the steam generator unit and pressurizing of the hot precursor fluid is effected solely by heating of said water as it passes through the steam generator unit.

34. A method according to claim 28, further including the step of aspirating surplus air into the mixing chamber, heating the aspirated air and mixing the aspirated air with the hot treatment fluid to increase the mass of hot gas in the treatment fluid that is expelled through the discharge outlet of the housing.

35. A method according to claim 34, wherein said air is aspirated into the mixing chamber solely by the action of discharging the hot treatment fluid from the mixing chamber past the discharge outlet of the housing.

36. A method according to claim 28, wherein the hydrocarbon fuel is liquefied petroleum gas (LPG).

* * * * *

UNITED STATES PATENT AND TRADEMARK OFFICE
CERTIFICATE OF CORRECTION

PATENT NO.      : 6,505,437 B1                                              Page 1 of 1
DATED           : January 14, 2003
INVENTOR(S)     : Ian Johnstone et al.

It is certified that error appears in the above-identified patent and that said Letters Patent is hereby corrected as shown below:

Title page,
Item [57], ABSTRACT,
Line 2, "disclosed" should read -- provided --;
Line 3, "being mixed combustion" should read -- mixed with combustion --;
Line 4, "dry stream" should read -- dry steamed --;
Line 5, "posts" should read -- pests --.

Column 17,
Line 27, "generate a combustion" should read -- generate combustion --.

Column 19,
Line 7, before "sufficient" delete "period".
Line 14, after "time", delete "period".

Signed and Sealed this

Eleventh Day of March, 2003

JAMES E. ROGAN
*Director of the United States Patent and Trademark Office*